June 1, 1954                 J. F. BARNES                2,679,954
DISPENSING CONTAINER HAVING A SLITTED RESILIENT
CLOSURE DISK AND A SEALING TAB
Filed May 23, 1951                                               2 Sheets-Sheet 1
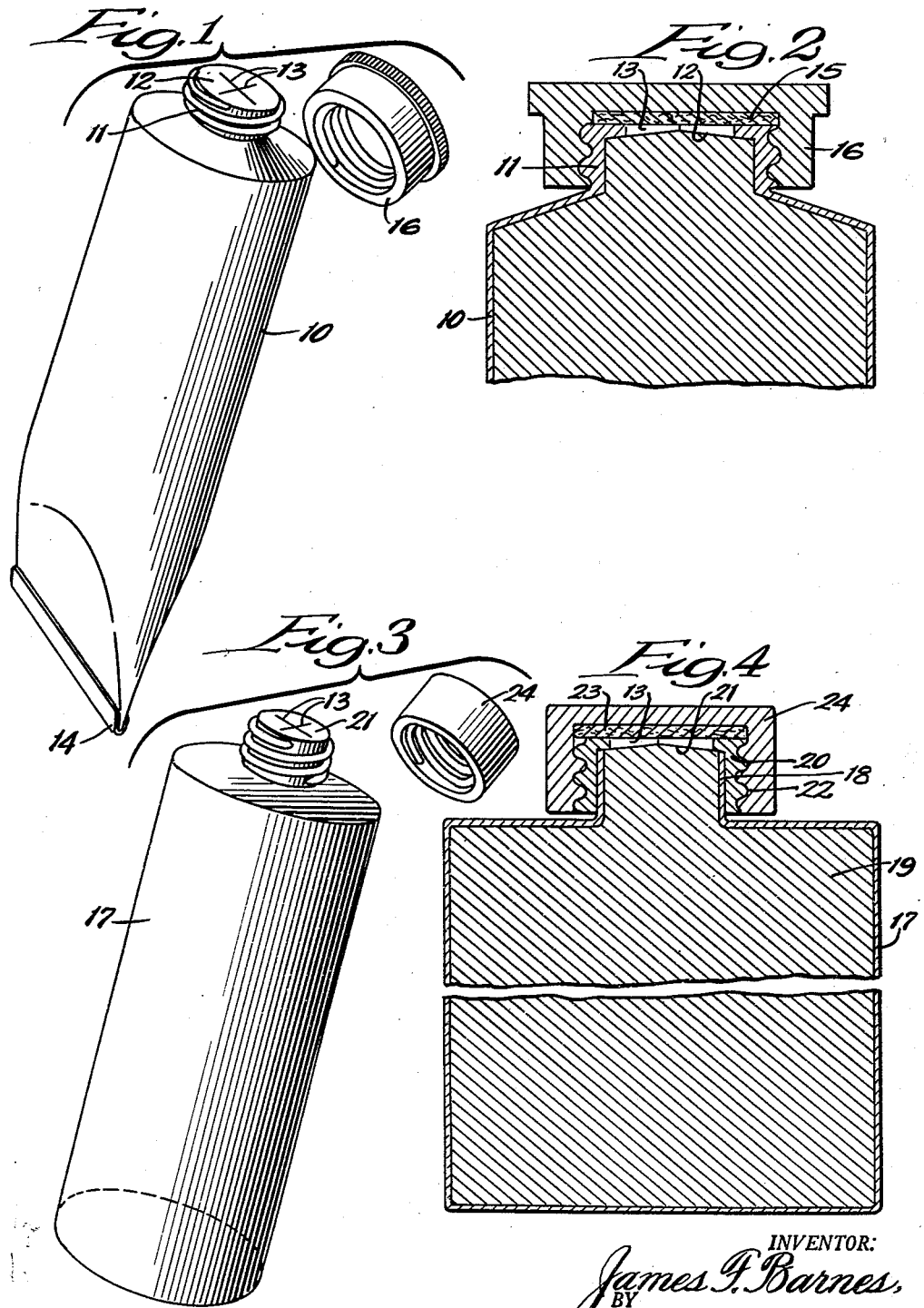
INVENTOR:
James F. Barnes,
BY
Dawson & Orms,
ATTORNEYS.

June 1, 1954  J. F. BARNES  2,679,954
DISPENSING CONTAINER HAVING A SLITTED RESILIENT
CLOSURE DISK AND A SEALING TAB
Filed May 23, 1951  2 Sheets-Sheet 2
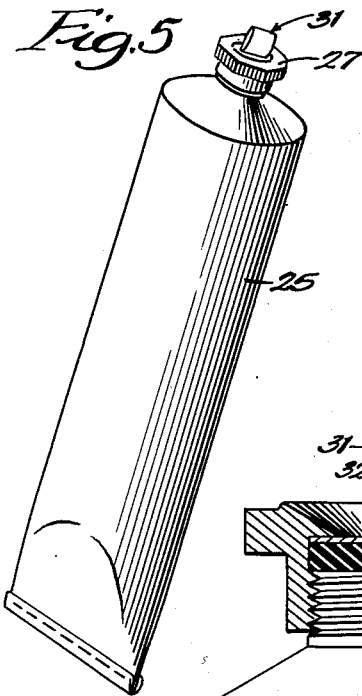
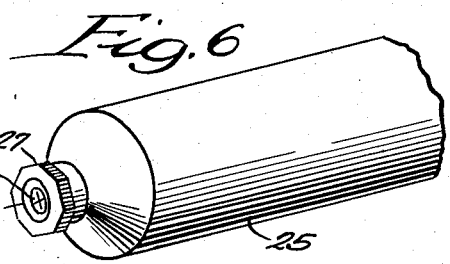
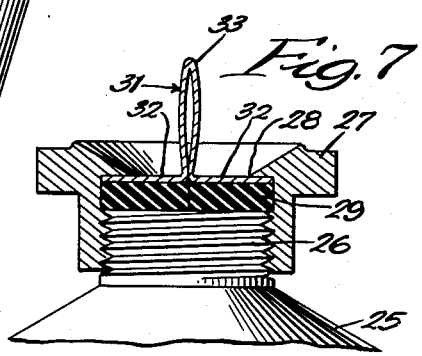
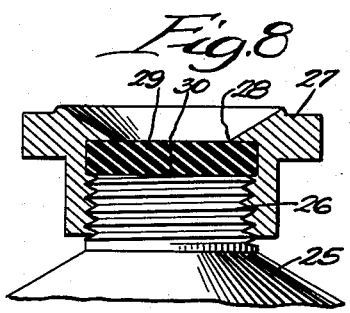
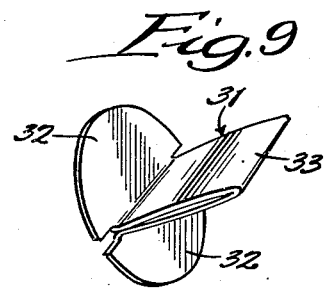
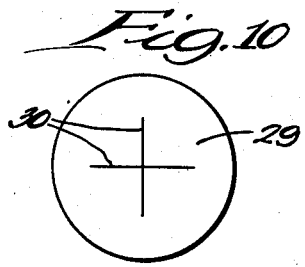
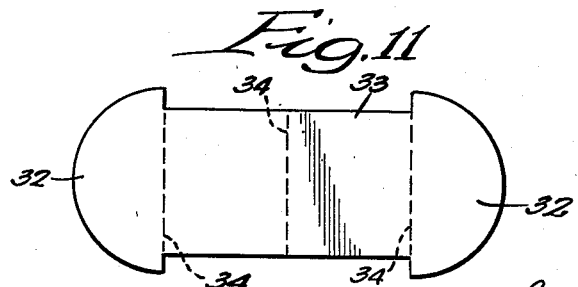
INVENTOR:
James F. Barnes,
BY
Dawson & Ooms,
ATTORNEYS.

UNITED STATES PATENT OFFICE 2,679,954

DISPENSING CONTAINER HAVING A SLITTED RESILIENT CLOSURE DISK AND A SEALING TAB

James F. Barnes, Chicago, Ill.

Application May 23, 1951, Serial No. 227,922

2 Claims. (Cl. 222—490)

This invention relates to a dispensing container. The invention is particularly useful in the dispensing of shaving cream, cold cream, tooth paste and various foodstuffs and other plastic material.

In the dispensing of soft plastic materials, the provision of a resilient cap with an open slit through which the plastic material may be dispensed provides serious problems. The soft plastic material tends to dry between the surfaces of the rubber or other material and to provide air channels, causing the material inside of the container to harden and lose its plasticity. Further, the screw closures employed permit air to filter therethrough and to enter the area about the closure and to channel through openings therein. As the result of such disadvantages, such disadvantages, successful dispensing containers have not been successfully introduced.

An object of the present invention is to provide a structure overcoming the above-described disadvantages while providing a highly efficient means for dispensing soft plastic materials, while preserving the materials within the container in their desirable plastic condition. A further object is to provide a plastic container having the dispensing portion thereof also formed of plastic material to present thin valve surfaces which cut away the plastic material and form tight sealing agents which exclude air from the interior of the container. A further object is to provide in combination with a resilient body effective means for sealing the resilient body to prevent the drying of plastic material between the slitted portions thereof and consequent channeling of air therethrough. Other specific objects and advantages will appear as the specification proceeds.

The invention is shown in illustrated embodiments by the accompanying drawings, in which—

Figure 1 is a perspectve view of a container embodying my invention, the cap being removed therefrom; Fig. 2, an enlarged vertical sectional view of the upper portion of the container with the cap thereon; Fig. 3, a view similar to Fig. 1 but showing a modified form of construction; Fig. 4, a broken vertical sectional view of the structure shown in Fig. 3; Fig. 5, a perspective view of another modified form of container embodying my invention; Fig. 6, a perspective view of the structure shown in Fig. 5 with the sealing tab removed; Fig. 7, a broken vertical sectional view; Fig. 8, a view similar to Fig. 7 but showing the seal tab removed; Fig. 9, a perspective view of the seal tab; Fig. 10, a plan view of the resilient sealing disc; and Fig. 11, a top plan view of the sealing pull tab.

In the illustration given in Figs. 1 and 2, I provide a tube 10 of plastic material provided with an integral neck 11 and a slitted integral top wall 12. The top wall 12 may be provided with a single transverse slit or with a cross-slit 13 as illustrated. It will be understood that the slit or slits may be formed in any desired configuration. By making the top wall integral with the neck 11 and container 10, I find that the wall can be formed of very thin plastic material which after removal of the plastic material cuts off the material removed and forms a tight seal between the slit edges.

Any suitable plastic material may be used. I prefer to employ polyvinyl or polyethylene material but it will be understood that other suitable plastics such as vinyl acetate co-polymers, vinylidine chloride, polyamides, etc. may be employed. The flexible plastic material is formed with the upper end thereof closed by the wall 12 and the plastic material is inserted thereinto through the lower open end, the lower end being then sealed at 14, as shown more clearly in Fig. 1. The top wall 12 is then preferably slitted and over the slitted portion is placed a sealing pad 15 and a screw closure 16 is then placed in position as illustrated in Fig. 2.

If desired, the plastic container may be formed in bottle form, that is, with a circular or flat bottom, as illustrated in Figs. 3 and 4. Here the container 17 is initially provided with an open neck 18 through which the material 19 is introduced into the bottle. To the neck 18 is secured a seal member 20 having an integral plastic wall 21 provided with slits 13. The member 20 is preferably provided with integral threads 22 and may be secured to the plastic neck by mutual solvents or by heat-sealing, adhesive, etc. Over the member 20 is a resilient disc 23 of rubber, plastic or other suitable material, and a closure 24 presses the member 23 against the integral wall 21.

Operation

In the operation of structures 1 to 4 inclusive, the user removes the cap 16 or 24 and the pads 15 or 23 and these if desired may both be discarded. Thereafter, the plastic material may be forced from the container by simply pressing the flexible plastic walls of the container. The plastic closure wall 12 or 21 presents sharp thin edges which flex with the outflow of the plastic material but which, upon the release of pressure, cut quickly into the plastic material to sever it and then form tight sealing edges along the slits 13. Air is thus excluded from the interior of the containers 10 and 17.

In the modification illustrated in Figs. 5 to 11 inclusive, I provide a flexible tube or container 25 equipped with a threaded neck portion 26, the neck being enclosed by a threaded cap 27. The cap 27 is apertured centrally at 28. A closure disc 29 is clamped by the cap 27 against the top of the neck 26 to form a seal therewith. The disc 29 may be formed of rubber or other resilient material and is provided with a slit 30 which may be of any desired shape.

A sealing pull tab 31 is formed from a flat strip of paper, plastic or other suitable material, the flat strip being shown as indicated in Fig. 11. The semicircular sealing portions 32 are connected by a pull tab portion 33 and when the parts are folded along the fold lines 34, as indicated in Fig. 11, a seal structure is produced as shown in Figs. 7 and 9. The pull tab portion 33 extends through the aperture 28 of the cap 27 while the semicircular portions 32 are effective in forming a tight seal about the slitted resilient member 29.

In operation, the sealing tab 31 is clamped tightly against the resilient member 29 and is thus held under pressure to prevent the flow of air through the slitted member 29 and into the plastic container. When it is desired to use the container for the dispensing of plastic material therefrom, the cap 27 may be rotated to release the grip thereof upon the tab 31 and, when the cap is partly unscrewed, the pull tab 33 may be grasped and the tab 31 removed through the central opening 28 of cap 27. In the latter operation, the resilient or flexible members 32 bend inwardly as the sealing tab is removed.

With the above structure, it will be noted that while a resilient dispensing member 29 is employed, air is excluded from the resilient member until the container is ready for use. Then a slight rotating of the cap 27 permits a removal of the sealing member and thereafter plastic material may be dispensed freely through the disc 29, and for this latter operation the screw cap 27 is again tightened upon the disc 29 to hold it firmly against the top of the container neck 26.

In each of the foregoing structures, the slitted wall is covered with a sealing pad over the slitted portion so that during transit there is no chance for air to enter the container. Particularly, where the plastic closure wall is employed, the platic material immediately after being excluded is cut away by the edges of the plastic closure and a tight seal is thus provided about the edges of the slit. Where the resilient closure is used, a pull tab is effective in sealing the same and the tab may be removed without removal of the cap.

While in the foregoing specification I have set forth specific structures in considerable detail for the purpose of illustrating embodiments of the invention, it will be understood that such details of structure may be varied widely by those skilled in the art without departing from the spirit of my invention.

I claim:

1. A dispensing container for soft plastic material having a neck, said neck being equipped with a thin resilient disc slitted to provide a dispensing closure wall, a sealing tab covering said disc and being provided with a pull tab, said sealing tab being formed from a strip of yieldable material folded laterally adjacent each end thereof and folded centrally to provide said pull tab, and a cap centrally apertured to receive said pull tab and having an inwardly-extending shoulder engageable with the laterally-folded portions of said sealing tab to clamp the same upon said disc, whereby upon the partial loosening of said cap said tab may be withdrawn through said aperture.

2. The structure of claim 1 in which said disc is provided with elongated, intersecting slits.

References Cited in the file of this patent

UNITED STATES PATENTS

| Number | Name | Date |
|---|---|---|
| 868,721 | Summers | Oct. 22, 1907 |
| 1,122,868 | Davis | Dec. 29, 1914 |
| 1,607,993 | Loewy | Nov. 23, 1926 |
| 1,825,553 | Smith | Sept. 29, 1931 |
| 1,996,156 | Janssen | Apr. 2, 1935 |
| 2,147,164 | Kent | Feb. 14, 1939 |
| 2,368,944 | Parkhurst | Feb. 6, 1945 |